(12) United States Patent
Mizoguchi

(10) Patent No.: US 6,407,772 B2
(45) Date of Patent: *Jun. 18, 2002

(54) IMAGE PICKUP APPARATUS DISPLAYING RECORDING CAPACITY

(75) Inventor: Yoshiyuki Mizoguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,908

(22) Filed: Nov. 4, 1997

Related U.S. Application Data

(63) Continuation of application No. 08/272,155, filed on Jul. 8, 1994, now abandoned.

(30) Foreign Application Priority Data

Jul. 16, 1993 (JP) .............................................. 5-176775

(51) Int. Cl.$^7$ .............................................. H04N 5/225
(52) U.S. Cl. .................................. 348/220; 348/333.02
(58) Field of Search .................................. 348/207, 220, 348/231, 232, 384, 221, 55, 64, 341, 333.01, 333.02, 333.12; 386/27, 109, 117, 112; 358/906, 909.1

(56) References Cited

U.S. PATENT DOCUMENTS

| | | | |
|---|---|---|---|
| 4,858,028 A | | 8/1989 | Okino |
| 4,959,735 A | * | 9/1990 | Kawai ....................... 360/33.1 |
| 5,032,927 A | * | 7/1991 | Watanabe et al. |
| 5,218,452 A | * | 6/1993 | Kondo et al. |
| 5,359,422 A | * | 10/1994 | Kukushima |

FOREIGN PATENT DOCUMENTS

| | | | | |
|---|---|---|---|---|
| JP | 3-154575 | * | 7/1991 | .......... H04N/5/225 |
| JP | 6-133193 | * | 5/1994 | .......... H04N/5/225 |

* cited by examiner

Primary Examiner—Tuan Ho
(74) Attorney, Agent, or Firm—Fitzpatrick, Cella, Harper & Scinto

(57) ABSTRACT

Apparatus is provided for use with an image recording device which records images on a recording medium. The image recording device has (i) structure for detecting one of a remaining amount and a used amount of recording medium capacity, and (ii) a display for displaying the amount of recording medium capacity detected by the detecting structure. The apparatus for use with such an image recording device includes image recording mode-setting structure for setting an image recording mode of the image recording device to one of a first mode and a second mode. A processor is provided for causing the display to display the amount of recording medium capacity as a first value in the first image recording mode and as a second, different, value in the second image recording mode. Preferably, the display displays either frames or recording time for the recording medium. Preferably, the first and second image recording modes may be either still/continuous modes, different compression modes, or different speeds of continuous photographing. Also, the display may be switched between used capacity and remaining capacity of the recording medium.

31 Claims, 3 Drawing Sheets

```
STILL
CONTINUOUS        : 1/15s
PHOTOGRAPHING
COMPRESSION
  RATIO           (F,S,E) MODE
USED AMOUNT
REMAINING         15ₘ37ₛ FRAMES
 AMOUNT
```

FIG.2

```
CONTINUOUS       : 1/5s
PHOTOGRAPHING

COMPRESSION   (F    ) MODE
  RATIO

REMAINING     ──  ₘ18ₛ
 AMOUNT
```

FIG.3 (a)

```
STILL

COMPRESSION   (F    ) MODE
  RATIO

REMAINING     ──  94 FRAMES
 AMOUNT
```

FIG.3 (b)

```
CONTINUOUS       : 1/15s
PHOTOGRAPHING

COMPRESSION   (F    ) MODE
  RATIO

REMAINING     15ₘ37ₛ
 AMOUNT
```

FIG.3 (c)

```
STILL

COMPRESSION   (F    ) MODE
  RATIO

REMAINING     ── ── FRAMES
 AMOUNT
```

FIG.3 (d)

```
┌─────────────────────────────────┐
│ CONTINUOUS      : 1/15s         │
│ PHOTOGRAPHING                   │
│                                 │
│ COMPRESSION  ( S  ) MODE        │
│   RATIO                         │
│                                 │
│ REMAINING        15ₘ37s         │
│  AMOUNT                         │
└─────────────────────────────────┘
```

FIG.4(a)

```
┌─────────────────────────────────┐
│ CONTINUOUS      : 1/60s         │
│ PHOTOGRAPHING                   │
│                                 │
│ COPMPRESSION ( S  ) MODE        │
│   RATIO                         │
│                                 │
│ REMAINING      — 3ₘ54s          │
│  AMOUNT                         │
└─────────────────────────────────┘
```

FIG.4(b)

```
┌─────────────────────────────────┐
│ STILL                           │
│                                 │
│ COMRPESSION   (F    ) MODE      │
│   RATIO                         │
│                                 │
│ REMAINING    — — 17 FRAMES      │
│  AMOUNT                         │
└─────────────────────────────────┘
```

FIG.5(a)

```
┌─────────────────────────────────┐
│ STILL                           │
│                                 │
│ COMRESSION    (     E) MODE     │
│   RATIO                         │
│                                 │
│ REMAINING    — — 87 FRAMES      │
│  AMOUNT                         │
└─────────────────────────────────┘
```

FIG.5(b)

```
┌─────────────────────────────────┐
│ CONTINUOUS     : 1/15s          │
│ PHOTOGRAPHING                   │
│                                 │
│ COMRESSION   (F    ) MODE       │
│   RATIO                         │
│                                 │
│  USED         — 1ₘ13s           │
│ AMOUNT                          │
└─────────────────────────────────┘
```

FIG.6(a)

```
┌─────────────────────────────────┐
│ STILL                           │
│                                 │
│ COMPRESSION  (F    ) MODE       │
│   RATIO                         │
│                                 │
│  USED          10 96 FRAMES     │
│ AMOUNT                          │
└─────────────────────────────────┘
```

FIG.6(b)

IMAGE PICKUP APPARATUS DISPLAYING RECORDING CAPACITY

This application is a continuation of application Ser. No. 08/272,155, filed Jul. 8, 1994, now abandoned.

BACKGROUND OF THE INVENTION

1. Field of the Invention

This invention relates to an image pickup apparatus which displays the recording capacity of the recording medium.

2. Description of the Related Art

There are known image pickup apparatuses which can perform still and continuous (movie) photographing and recording operations. However, sufficient consideration has not yet been given to display methods with respect to such recording device memories (tapes, films, and the like).

Some silver-film cameras, which use silver films, have a single-photographing function of photographing a one-frame image in response to a single shutter release operation, and a continuous-photographing function of repeating photographing operations at a predetermined time interval during one shutter release operation. Pictures taken by a continuous photographing operation in such a silver-film camera can be seen at one time after printing the pictures, in contrast to reproduction in a video camera in which pictures are individually reproduced time-serially. Accordingly, in silver-film cameras display of remaining recording capacity on a time base is not performed, and only the number of used frames or the number of remaining frames is displayed or indicated based on the total number of frames of the film.

Recently, some camcorders, which can also record still pictures by operating a still-photographing operation member, have been on the market. However, the still-photographing operation is only an auxiliary function, and the used amount or the remaining amount of a tape is displayed only in units of hours/minutes/seconds. In a movie-photographing operation in a camcorder, the photographing rate is fixed at 60 fields/second or 50 fields/second conforming to broadcast standards, such as NTSC, PAL, or the like. Accordingly, the used amount or the remaining amount of tape is displayed only in terms of time at the fixed photographing rate.

SUMMARY OF THE INVENTION

It is an object of the present invention to solve the above-described problems.

In one aspect of the present invention, an apparatus is provided for use with an image recording device which records images on a recording medium, the image recording device having (i) means for detecting one of a remaining amount and a used amount of recording medium capacity, and (ii) a display for displaying the amount of recording medium capacity detected by the detecting means. The apparatus comprises an image recording mode-setting means for setting an image recording mode of the image recording device to one of a first mode and a second mode. A processor is provided for causing the display to display the amount of recording medium capacity as a first value in the first image recording mode and as a second, different value in the second recording mode.

It is another object of the present invention to provide an optimum display method for a recording device of a photographing apparatus capable of performing still- and continuous-photographing and recording operations.

In another aspect of the present invention, by detecting whether the current photographing mode is a still-photographing mode or a continuous-photographing mode, the recorded capacity or the unrecorded capacity of a recording device for recording information of images of objects is displayed in units of a frame in the still-photographing mode, and in units of time in the continuous-photographing mode, so that the remaining capacity (the number of frames in a still-photographing operation, and time in a continuous-photographing operation) of the recording device for the subsequent photographing operation in the set photographing mode can be seen at a glance.

In another aspect of the present invention, by displaying the unrecorded capacity of a recording device for recording information of images of objects only when the unrecorded capacity becomes equal to or less than a predetermined value, a display having a plurality of digits is unnecessary, so that the size and the cost of an apparatus can be reduced.

In still another aspect of the present invention, when displaying the recorded capacity or the unrecorded capacity of a recording device for recording information of images of objects, the display is performed in units of a frame when a still-photographing starting member has been operated, and the display is performed in units of time when a continuous-photographing starting member has been operated, so that a display corresponding to the current photographing mode is automatically performed.

In yet another aspect of the present invention, when displaying the recorded capacity or the unrecorded capacity of a recording device for recording information of images of objects, in a mode of performing a continuous-photographing operation with a set time interval or speed, the contents of the display are changed in accordance with the set time interval or speed, so that the time period allowed for the subsequent continuous-photographing operation at the set interval or speed can be seen at a glance.

In yet a further aspect of the present invention, when displaying the recorded capacity or the unrecorded capacity of a recording device for recording information of images of objects by compressing the information with a set compression ratio, the contents of the display are changed in accordance with the set compression ratio, so that the remaining capacity (the number of frames in a still-photographing operation, and time in a continuous-photographing operation) for the photographing operation in the set photographing mode can be seen at a glance.

The foregoing and other objects, advantages and features of the present invention will become more apparent from the following detailed description of the preferred embodiment taken in conjuction with the accompanying drawings.

BRIEF DESCRIPTION OF THE DRAWINGS

FIG. 2 is a diagram illustrating the entire display contents on a display unit in the embodiment; and FIGS. 3(a), 3(b), 3(c), 3(d), 4(a), 4(b), 5(a), 5(b), 6(a), and 6(b) are diagrams illustrating examples of the display on the display unit shown in FIG. 2.

DETAILED DESCRIPTION OF THE PREFERRED EMBODIMENT

Figure 1:
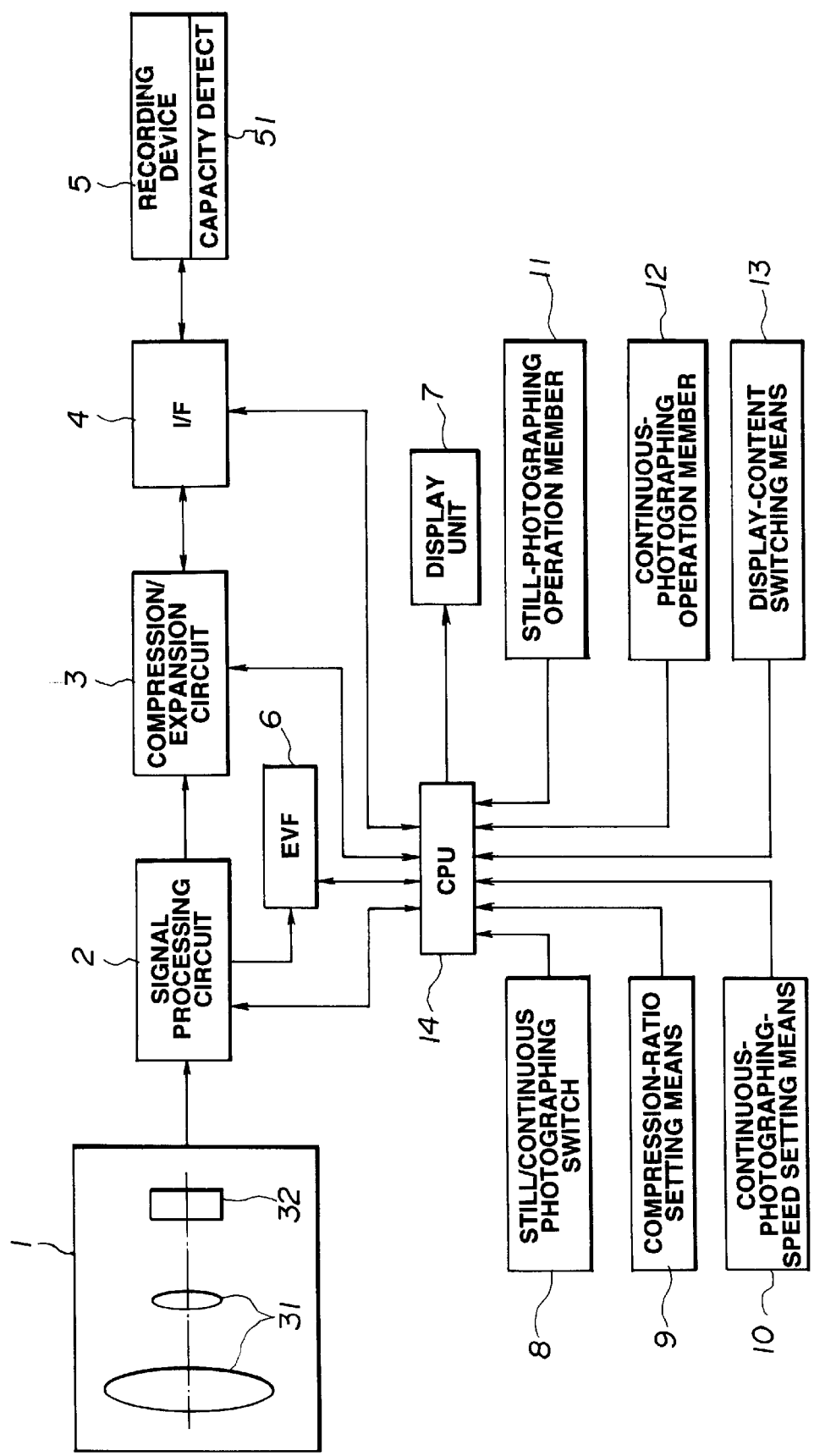
FIG. 1 is a diagram illustrating the configuration of an apparatus according to an embodiment of the present invention.

FIGS. 1 through 6(b) illustrate an embodiment of the present invention.

In FIG. 1, a still/continuous photographing switch 8 is used for switching the photographing mode of a camera between a still-photographing mode and a continuous-photographing mode. Compression-ratio setting means 9 switches the compression ratio of a compression circuit 3 (to be described later) among ½ (a high-picture-quality mode: F), ⅕ (a standard mode: S) and ¹⁄₁₀ (a multiple-frame-photographing mode: E). Continuous-photographing-speed setting means 10 assigns a continuous-photographing speed during a continuous-photographing operation. An arbitrary speed equal to or lower than 60 frames/second can be assigned. Display-contents switching means 13 switches the display relating to the used state of a recording device provided on a display unit 7 between the display of the used capacity and the display of the remaining capacity. An operation button 11 is used for providing a trigger to start a still-photographing operation. An operation button 12 is used for providing a trigger to start a continuous-photographing operation. Accordingly, a still-photographing operation is performed by operating the button 11, and a continuous-photographing operation is performed at a continuous-photographing speed (set by the continuous-photographing-speed setting means 10) by operating the button 12.

In an image pickup unit 1, a CCD (charge-coupled device) 32 performs photoelectric conversion of an image of an object imaged by an imaging lens system 31 and outputs an electrical signal representing the image. The signal is processed into a video signal by a known signal processing circuit 2. The video signal is supplied to a connector (not shown) for connecting the signal processing circuit 2 to an EVF 6 and an external display unit for the purpose of display, and is also supplied to a compression/expansion circuit 3 in order to record the video signal in a recording device 5. The compression/expansion circuit 3, comprising known means, converts the video signal into a digital video signal, compresses the digital video signal with the compression ratio set by the compression-ratio setting means 9, and supplies the recording device 5 with the compressed signal via an I/F (interface) 4. The I/F 4 is an interface between the compression/expansion circuit 3 and the recording device 5. The I/F 4 records the signal from the compression/expansion circuit 3 in response to a command from a CPU (central processing unit) 14, and reads image information from the recording device 5 and supplies the compression/expansion circuit 3 with the read information. The I/F 4 also communicates results of detection by a known detector 51, provided in the recording device 5, for detecting the total recording capacity, the recorded capacity and the unrecorded capacity of the entire recording device 5 to the CPU 14. The EVF 6 superposes various kinds of information with the video signal obtained from the signal processing circuit 2, and displays the resultant information.

The display unit 7 displays various kinds of information relating to the camera's operating state. The display unit 7 can be any type of indicating device for conveying information, including visual, audio and tactile indicating devices. FIG. 2 illustrates the contents of the display on the picture surface of the display unit 7. A notation "still" is displayed in the case of the still-photographing mode, and a notation "continuous photographing: (continuous-photographing speed) ¹⁄₁₅ s" is displayed in the case of the continuous-photographing mode, in accordance with the selected photographing mode. Notations "F", "S" and "E" are displayed when the compression ratio is ½ (the high-picture-quality mode: F), ⅕ (the standard mode: S) and ¹⁄₁₀ (the multiple-frame-photographing mode: E), respectively. In addition, information relating to the state of the use of the recording device 5 (the used capacity or the remaining capacity) is displayed.

Next, a description will be provided of the display operation of the display unit 7 in the present embodiment.

First, power is supplied to the camera using a switch (not shown). When the still/continuous photographing switch 8 has been used to set the photographing mode to the continuous-photographing mode, the continuous-photographing-speed setting means 10 has been used to set the continuous-photographing speed to ⅕ s, the compression-ratio setting means 9 has been used to set the compression ratio to the high-picture-quality mode F, and the display-contents switching means 13 has set the display contents to remaining-amount display, as shown in FIG. 3(a), notations "continuous photographing: ⅕ s", "compression ratio F mode" and "remaining amount" are displayed, and the remaining amount of the recording device 5 is displayed in terms of the time period remaining for a continuous-photographing operation with a speed of five frames per second as "0 M (minutes) 18 S (seconds)". At that time, if the still/continuous photographing switch 8 has been used to set the photographing mode to the still-photographing mode, as shown in FIG. 3(b), the setting ⅕ s by the continuous-photographing-speed setting means 10 is neglected, and notations "still", "compression ratio F mode" and "remaining amount" are displayed, then the remaining amount of the recording device 5 is displayed in terms of frames allowed for still-photographing operations as "94 frames". At that time, as described above, the unrecorded capacity (remaining capacity) of the recording device 5 is detected by the detector, and is communicated to the CPU 14 via the I/F 4. The CPU 14 converts the communicated amount in terms of the time allowed for a continuous-photographing operation, or in terms of the number of frames allowed for still-photographing operations, and displays the converted value.

As described above, by displaying the capacity of the recording device in units corresponding to the mode of the subsequent photographing operation, the remaining capacity (the number of frames in still-photographing operations, and time in a continuous-photographing operation) for a subsequent photographing operation in the set photographing mode can be seen at a glance.

As shown in FIG. 3(c), in the case of notations "continuous photographing: ¹⁄₁₅ s", "compression ratio F mode" and "remaining amount 15 M 37 S", if the still/continuous photographing switch 8 is used to switch the photographing mode to the still-photographing mode, the number of frames allowed for still-photographing operations is obtained as 937 seconds (15 minutes 3 seconds)×15 frames/second=14055 (frames), so that the number cannot be displayed on the display unit 7. Accordingly, as shown in FIG. 3(d), when the number of frames allowed for still-photographing operations equals at least 9999 (frames), the display is shown as "- - -", because it is unnecessary to care for the remaining amount in still-photographing operations.

The used amount reaches, in some cases, at least 9999 frames also when the display-contents switching means 13 is used to set the contents of the display to the used-amount display. Also in such a case, the notation "_ _ _" is displayed in a flashing state in order that the display should be switched to the remaining-amount display.

As described above, a numerical display is not provided when the unrecorded capacity or the used capacity is very large and thus a display having a large number of digits is not required. Hence, it is possible to reduce the size and the cost of the apparatus.

Next, a description will be provided of changes in the display which will be produced when switching the continuous-photographing speed, with reference to FIGS. 4(a) and 4(b). FIG. 4(a) illustrates the display when the photographing mode is the continuous-photographing mode with a speed of 1/15 s, the compression ratio is set to the standard mode (S), and the display contents are set to the remaining-amount display. FIG. 4(a) indicates that a remaining amount corresponding to a continuous-photographing operation for "15 minutes 37 seconds" is present. At that time, if the continuous-photographing-speed setting means 10 is used to set the continuous-photographing speed to 1/60 s, since the number of frames photographed in a second increases by four times from 15 frames to 60 frames, the time period allowed for a continuous photographing operation is reduced by 1/4. Hence, as shown in FIG. 4(b), the remaining-amount display becomes "3 minutes 54 seconds".

As described above, by switching the contents of the display in accordance with the set continuous-photographing-speed, the time period allowed for the subsequent continuous-photographing operation (at the set continuous-photographing speed) can be seen at a glance, and the exhaustion of the capacity of the recording medium during a photographing operation can be prevented in advance.

Next, a description will be provided of changes in the display which will be produced when switching the compression ratio, with reference to FIGS. 5(a) and 5(b). FIG. 5(a) illustrates the display when the photographing mode is set to the still-photographing mode, the compression ratio is set to the high-picture-quality mode (F: compression ratio of ½), and the contents of the display are set to remaining-amount display. FIG. 5(a) indicates that a remaining amount corresponding to "17" photographing operations (of "17" frames) is present. At that time, if the compression-ratio setting means 9 is used to set the compression ratio to the multiple-frame-photographing mode (E: compression ratio of 1/10), the compression ratio changes from ½ to 1/10, and therefore the recording capacity used for recording one frame is reduced by 1/5. Hence, the number of frames allowed for still-photographing operations increases 5 times, and the remaining-amount display becomes "87 frames", as shown in FIG. 5(b).

As described above, by switching the contents of the display in accordance with the set compression ratio, the remaining capacity (the number of frames in still-photographing operations, and time in a continuous-photographing operation) for the subsequent photographing operation at the set compression ratio can be seen at a glance, and the exhaustion of the capacity during a photographing operation can be prevented in advance.

Next, a description will be provided of changes in the display which will be produced during a camera photographing operation, with reference to FIGS. 6(a) and 6(b). FIG. 6(a) illustrates the display when the photographing mode is set to the continuous-photographing mode at a speed of 1/15 s, the compression ratio is set to the high-picture-quality mode (F), and the contents of the display are set to used-amount display. FIG. 6(a) indicates that a recorded amount corresponding to a continuous-photographing operation of "1 minute 13 seconds" is present. In the camera of the present embodiment, in order to respond to an instantaneous request of a photographer, the photographing mode can be changed by operating the still-photographing operation member 11 or the continuous-photographing operation member 12 in spite of the setting of the photographing mode through the still/continuous photographing switch 8, so that a still-photographing operation or a continuous-photographing operation desired by the photographer can be performed. Accordingly, if the still-photographing operation member 11 is operated, a still-photographing operation is performed, and, as shown in FIG. 6(b), the display is automatically changed to the still-photographing mode, and the used capacity becomes "1096 frames". If the continuous-photographing operation member 12 is operated in the still-photographing mode, the display is automatically changed to display units of time for the continuous-photographing mode.

As described above, by automatically switching the display relating to the capacity of the recording device to a display corresponding to the actuated photographing operation member, the capacity of the recording device after a photographing operation can be confirmed in units corresponding to the photographing mode.

In the present embodiment, fractions are rounded up in the display of the used amount, and fractions are rounded down in the display of the remaining amount. This processing is performed in order to ensure that the actual remaining capacity is greater than the displayed remaining capacity. For example, the remaining amount of "94 frames" shown in FIG. 3(b) would be converted into the remaining amount of "18 seconds" shown in FIG. 3(a) instead of 18 4/5 seconds (corresponding to 94 divided by five) or rounded up to 19 seconds. The same kind of processing is performed in the cases of FIGS. 4(a) through 6(b).

As described above, the present invention has the following effects.

(1) By detecting whether the current photographing mode is a still-photographing mode or a continuous-photographing mode, the recorded capacity or the unrecorded capacity of a recording device for recording information of images of objects is displayed in units of a frame in the still-photographing mode, and in units of time in the continuous-photographing mode, so that the remaining capacity (the number of frames in a still-photographing operation, and time in a continuous-photographing operation) for the subsequent photographing operation in the set photographing mode can be seen at a glance, and the operability of the apparatus is greatly improved.

(2) By not displaying the remaining amount in a state in which photographing operations can be performed without paying much attention to the unrecorded capacity of a recording device, and displaying the unrecorded capacity of the recording device only when the unrecorded capacity becomes equal to or less than a predetermined value, a display requiring a great number of digits is omitted, so that the size of the apparatus can be reduced. Furthermore, when displaying numerals in the same size, the size of the numerals can be increased, so that visibility can be greatly improved. Moreover, by reducing the number of display digits, the cost of the display unit and the driving circuit can be reduced.

(3) By providing a display related to the capacity of a recording device in units of a frame when a still-photographing operation member has been operated, and in units of time when a continuous-photographing operation member has been operated, it is possible to automatically switch the display to a display corresponding to the current photographing mode, and to confirm the capacity after a photographing operation in units corresponding to the current photographing mode, and to greatly improve the operability of the apparatus.

(4) When performing a continuous photographing operation at a set speed, the contents of the display relating to the capacity of a recording device are changed in accordance with the set speed, so that the time period allowed for the subsequent continuous-photographing operation at the set speed can be seen at a glance, whereby the exhaustion of the capacity of the recording device during a photographing operation can be prevented in advance. In addition, the operability of the apparatus is greatly improved.

(5) By changing the contents of the display relating to the capacity of a recording device, for recording information of images of objects by compressing the information with a set compression ratio, in accordance with the set compression ratio, the remaining capacity (the number of frames in a still-photographing operation, and time in a continuous-photographing operation) for the subsequent photographing operation in the set photographing mode can be seen at a glance, whereby the exhaustion of the capacity of the recording device during a photographing operation can be prevented in advance. In addition, the operability of the apparatus can be greatly improved.

The individual components shown in outline or designated by blocks in the drawings are all well known in the image pickup apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:

picking up means for picking up images of an object;

a recording device for recording information derived from the images of the object picked up by said picking up means, said recording device having a first recording mode for recording information corresponding to a single image, and a second recording mode for recording information corresponding to a plurality of time-serially consecutive images;

a selection member for selecting between the first recording mode and the second recording mode of said recording device;

detecting means for detecting an amount of information that has been recorded by said recording device and/or an amount of information that has not yet been recorded by said recording device;

indicating means for indicating the amount of information detected by said detecting means; and switching means for switching an indication of said indicating means between indicating the amount of information detected by said detecting means as one of (i) frame-number information and (ii) recording-period information, according to the recording mode selected by said selection member.

2. An image pickup apparatus according to claim 1, wherein the indication of said indicating means indicates frame numbers when the mode of recording a single image is selected, and time information when the mode of recording a plurality of images is selected.

3. An image pickup apparatus comprising:

picking up means for picking up images of an object;

a recording device for recording information derived from the images of the object picked up by said picking up means, said recording device having a first recording mode for recording information corresponding to a single image, and a second recording mode for recording information corresponding to a plurality of time-serially consecutive images;

first operating means for operating said recording device in the first recording mode;

second operating means for operating said recording device in the second recording mode;

detecting means for detecting an amount of information that has been recorded by said recording device and/or an amount of information that has not yet been recorded by said recording device;

indicating means for indicating the amount of information detected by said detecting means; and control means for controlling said indicating means to indicate the amount of information detected by said detecting means as one of (i) frame number information when said recording device is operated by said first operating means, and (ii) time-period information when said recording device is operated by said second operating means.

4. An image pickup apparatus comprising:

picking up means for picking up images of an object;

input means for inputting a rate of recording image information corresponding to the images picked up by said picking up means;

a recording device for selectively recording one of (i) information corresponding to a single image of the object picked up by said picking up means in a first image recording mode, and (ii) information corresponding to a plurality of sequential images of the object picked up by said picking up means in a second image recording mode and in accordance with the rate input by the input means;

detecting means for detecting an amount of information that has been recorded by said recording device and/or an amount of information that has not yet been recorded by said recording device, and for generating a corresponding detection output signal;

indicating means for alternatively indicating the amount of information that has been recorded and/or the amount of information that has not been recorded in accordance with the detection output signal; and control means for causing said recording device to record information at the rate input by said input means, and for switching the amount of information indicated by said indicating means between (i) a number of frames, each corresponding to a single image, in the first image recording mode and (ii) a time amount in the second image recording mode in accordance with the rate set by said input means.

5. An image pickup means comprising:

picking up means for picking up images of an object;

input means for inputting a compression ratio;

compression means for compressing information derived from the images of the object picked up by said picking up means using the compression ratio input from said input means;

recording means for recording the information compressed by said compression means, in a first recording mode, for recording information corresponding to a single image and, in a second recording mode, for recording information corresponding to a plurality of time-consecutive images;

detecting means for detecting an amount of information that has been recorded by said recording device and/or an amount of information that has not yet been recorded by said recording means;

indicating means for indicating the amount of information detected by said detecting means in accordance with the compression ratio set by said input means; and switching means for switching an indication of said indicating means between indicating the amount of information detected by said detecting means as one of (i) frame-number information and (ii) recording-period information, according to the recording mode of said recording means.

6. An apparatus according to claim 5, wherein said plurality of time-consecutive images correspond to a movie image.

7. Apparatus for use with an image recording device which records images on a recording medium, the image recording device having (i) detecting means for selectively detecting an amount of information that has been recorded on the recording medium and/or an amount of information that has not yet been recorded on the recording medium, and (ii) an indicator for indicating the detected amount of information detected by the detecting means, said apparatus comprising:

switching means for switching the detecting means between detecting the amount of information that has been recorded on the recording medium, and detecting the amount of information that has not yet been recorded on the recording medium;

mode setting means for setting an image recording mode of the image recording device to one of a first image recording mode for individually recording single images, and a second image recording mode for recording a plurality of sequential images at a predetermined recording rate; and a processor for causing the indicator to indicate the amount of detected information as a first value when the image recording device is set in the first image recording mode and as a second, different value when the image recording device is set in the second image recording mode.

8. An apparatus according to claim 7, wherein the first image recording mode comprises a first compression ratio and the second image recording mode comprises a second compression ratio, and wherein said processor causes the indicator to indicate an amount of recording medium capacity as a number of frames in the first image recording mode and as a different number of frames in the second image recording mode.

9. An apparatus according to claim 7, wherein the first image recording mode comprises a first compression ratio and the second image recording mode comprises a second compression ratio, and wherein said processor causes the indicator to indicate an amount of recording medium capacity as a time amount in the first mode and as a different time amount in the second image recording mode.

10. An apparatus according to claim 7, wherein the first image recording mode comprises a first photographing speed and the second image recording mode comprises a second, continuous, photographing speed, and wherein said processor causes the indicator to indicate an amount of recording medium capacity as a first time amount in the first image recording mode and as a second, different time amount in the second image recording mode.

11. An apparatus according to claim 7, wherein the processor causes the indicator to change the first value to the second value in response to the mode-setting means changing the image recording from the first image recording mode to the second image recording mode.

12. An apparatus according to claims 4 and 7 wherein said plurality of sequential images correspond to a movie image.

13. An image recording apparatus comprising:

an image sensor, a recording device having first and second image recording modes for recording image signals from said image sensor;

an indicator;

a processor for controlling said image sensor, said recording device, and said indicator; and, wherein the first image recording mode comprises a single image recording mode and the second image recording mode comprises a plurality of images recording mode, and wherein said processor causes the indicator (i) to indicate an amount of recording information as a number of frames in the first image recording mode, and (ii) to indicate the amount of recording information as a time amount in the second image recording mode.

14. An apparatus according to claim 13, wherein said plurality of images correspond to a movie image.

15. An apparatus according to claim 13, further comprising a compression circuit for compressing said image signals.

16. An apparatus according to claim 15, further comprising a compression ratio changing circuit for changing a compression ratio.

17. An apparatus according to claim 16, wherein said processor changes an indication of said indicator according to the changing of said compression ratio.

18. An apparatus according to claim 13, wherein said processor causes said indicator to indicate recording medium capacity as said amount of recording information.

19. An image pickup apparatus comprising:

picking up means for picking up images of an object;

a recording device for recording information derived from the images of the object picked up by said picking up means, said recording device having a first recording mode for recording information corresponding to a single image, and a second recording mode for recording information corresponding to a plurality of time-serially consecutive images;

first operating means for operating said recording device in the first recording mode;

second operating means for operating said recording device in the second recording mode;

detecting means for detecting one of an amount of information that has been recorded by said recording device and an amount of information that has not yet been recorded by said recording device;

indicating means for indicating the amount of information detected by said detecting means; and control means for controlling said indicating means to indicate the amount of information detected by said detecting means as one of (i) frame number information when said recording device is operated by said first operating means, and (ii) time-period information when said recording device is operated by said second operating means.

20. An image pickup apparatus comprising:

picking up means for picking up images of an object;

a recording device for recording information derived from the images of the object picked up by said picking up means, said recording device having a first recording mode for recording a still image, and a second recording mode for recording a plurality of time-serially consecutive images;

first operating means for operating said recording device in the first recording mode;

second operating means for operating said recording device in the second recording mode;

detecting means for detecting one of an amount of information that has been recorded by said recording device and an amount of information that has not yet been recorded by said recording device;

indicating means for indicating the amount of information detected by said detecting means; and control means for controlling said indicating means to indicate the amount of information detected by said detecting means as one of (i) frame number information when said recording device is operated by said first operating means, and (ii) time-period information when said recording device is operated by said second operating means.

21. An apparatus according to any one of claims 1, 3, 7, 19 and 20, wherein said plurality of time-serially consecutive images correspond to a movie image.

22. A method of recording image signals from an image sensor by a recording device, comprising the steps of:

recording in a single image recording mode of the recording device and in a plurality-of-images recording mode of the recording device;

controlling processing in the single image recording mode of the recording device so as to indicate an amount of recording information as a number of frames; and controlling processing in the plurality-of-images recording mode so as to indicate an amount of recording information as a time amount.

23. A method of recording image signals from an image sensor by a recording device according to claim 22, further comprising the step of compressing the image signals.

24. A method of recording image signals from an image sensor by a recording device according to claim 23, further comprising the step of changing a compression ratio in the compressing of the image signals.

25. A method of recording image signals from an image sensor by a recording device according to claim 24, wherein controlling processing to indicate the amount of recording information is changed according to the change of the compression ratio.

26. A method of recording image signals from an image sensor by a recording device according to claim 23, wherein controlling processing to indicate the amount of recording information includes indicating recording medium capacity as the amount of recording information.

27. A computer usable medium having computer readable program code units for recording image signals from an image sensor by a recording device comprising:

a first program code unit for recording in a single image recording mode of the recording device and in a plurality-of-images recording mode of the recording device;

a second program code unit for controlling processing in the single image recording mode of the recording device so as to indicate an amount of recording information as a number of frames; and a third program code unit for controlling processing in the plurality-of-images recording mode so as to indicate the amount of recording information as a time amount.

28. A computer usable medium having computer readable program code units for recording image signals from an image sensor by a recording device according to claim 27, further comprising a fourth program code unit for compressing the image signals.

29. A computer usable medium having computer readable program code units for recording image signals from an image sensor by a recording device according to claim 28, further comprising a fifth program code unit for changing a compression ratio in the compressing of the image signals.

30. A computer usable medium having computer readable program code units for recording image signals from an image sensor by a recording device according to claim 29, wherein controlling processing in the second and third program code units operates so as to indicate the amount of recording information is changed according to the change of the compression ratio.

31. A computer usable medium having computer readable program code units for recording image signals from an image sensor by a recording device according to claim 27, wherein controlling processing so as to indicate the amount of recording information in the second and third program code units operates so as to indicate recording medium capacity as the amount of recording information.

* * * * *

UNITED STATES PATENT AND TRADEMARK OFFICE
CERTIFICATE OF CORRECTION

PATENT NO. : 6,407,772 B2
DATED : June 18, 2002
INVENTOR(S) : Yoshiyuki Mizoguchi It is certified that error appears in the above-identified patent and that said Letters Patent is hereby corrected as shown below:

<u>Column 1,</u>
Line 63, "still-" should read -- still --.

<u>Column 4,</u>
Lines 51 and 57, ""- - -"," should read -- "- -  - -", --.

<u>Column 12,</u>
Line 5, "claim 23," should read -- claim 22, --.

Signed and Sealed this

Twelfth Day of August, 2003

JAMES E. ROGAN
*Director of the United States Patent and Trademark Office*